United States Patent Office 3,243,476
Patented Mar. 29, 1966

3,243,476
GRAFT COPOLYMER OF A 5–6 MEMBERED LACTAM RING ONTO A POLYACRYLYL HALIDE BACKBONE
William B. Black, Raleigh, N.C., and David B. Capps, Ann Arbor, Mich., assignors to Monsanto Company, a corporation of Delaware
No Drawing. Filed Dec. 10, 1962, Ser. No. 243,639
4 Claims. (Cl. 260—857)

This application is a continuation-in-part of our copending application Serial No. 119,264, filed June 26, 1961, now abandoned.

This invention concerns novel graft copolymers as new compositions of matter. It further relates to a method for preparing the novel graft copolymers.

As is known, the term "graft copolymers" refers to polymeric products consisting essentially of polymeric chains derived from one polymerizable material (main chains) to which are chemically attached a number of non-polymeric chains derived from another polymerizable material (branch chains), the branch chains having one end free. This is in contrast to the more common and familiar copolymer wherein the monomeric units alternate in a regular or random manner depending upon the monomers used and the polymerization process employed. As is readily apparent, the properties of such copolymers are essentially an average of the properties of the corresponding homopolymers.

Now, referring again to graft copolymers, products with unusual and distinctive properties may sometimes be obtained when different polymerizable material is employed to prepare the side chains from that used in preparing the main chains. For in such instances, the different chemical structures of the main and side chains permits an interesting blend of properties in the ultimate polymer formed.

It is, therefore, a principal object of this invention to provide a novel graft copolymer in which the main chain or backbone is different from that of the side chains.

It is a further object of this invention to provide a method for preparing novel graft copolymers wherein the main chain or backbone is a homopolymer having activating sites for the polymerization of lactams, which consist of alpha-pyrrolidone and alpha-piperidone.

Other objects will become apparent as the following description of our invention proceeds.

The novel graft copolymers of this invention are characterized by the following general structural formula:

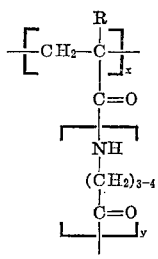

wherein R represents either hydrogen, an aryl radical or an alkyl radical with from 1 to 7 carbon atoms; wherein $x$ represents a number indicative of the extent of polymerization of the backbone polymer and can be from 5 to 10,000; and wherein $y$ represents the extent of polymerization of the branch chains and may be a number of from 5 to 5,000.

We produce the graft copolymers of the above general structure by first preparing a backbone homopolymer which has activating sites for initiating the polymerization of the lactams: alpha-pyrrolidone and alpha-piperidone. These activating sites are subsequently employed to induce or initiate the polymerization of the afore-noted monomers which are brought into contact therewith and as the lactam chains form, they are grafted on to the preformed backbone polymer. Preformed homopolymers which are eminently suited for accomplishing this result have the following general formula:

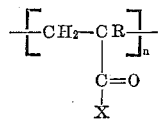

wherein $n$ is an integer of from 5 to 10,000 and X is a halide, preferably chlorine.

These polymers are well known and may be obtained by the polymerization of monomers, such as acrylyl chloride, methacrylyl chloride, butacrylyl chloride and alpha-phenylacrylyl chloride. Standard polymerization procedures may be employed. For example, the monomer is placed in a suitable solvent, such as carbon tetrachloride, and the resulting solution is brought to mild reflux where it is maintained until the polymer desired is formed. Advantageously, peroxide catalysts, such as benzoyl peroxide, are generally employed.

Upon this pre-formed polymer with activating sites for initiating lactam polymerization, we then graft polymerize a 5 to 6 membered ring lactam of the following general formula:

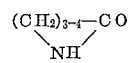

Compounds contemplated and embraced by this formula are alpha-pyrrolidone and alpha-piperidone.

In the reaction mixture of pre-formed polymer and lactam monomer used in the preparation of our novel graft copolymers, the pre-formed polymer may be present in an amount of from about 0.1 to 15 percent by weight and the lactam monomer in an amount of from about 85 to 99.9 percent by weight, based on the total weight of the reactant mixture. It is a primary requisite that part of the lactam monomer be present in the form of an alkali metal salt, e.g., as the sodium or potassium salt. This salt may be pre-formed or formed in situ, for example, by introducing sodium or potassium hydride into the reaction mixture with the homopolymer and lactam monomer. It is necessary that the lactam salt be present in an amount which at least slightly exceeds the quantity required to neutralize all of the acyl halide groups of the pre-formed backbone polymer. That is, it is necessary that some lactam salt be present after neutralization of the acyl halide has been attained in order to effect chain growth of the lactam side chains. It is, of course, understood that free lactam must also be present with the salt thereof—there being no restriction on the relative amounts of these two materials save that enough salt is present to meet the requirement recited above.

The grafting reaction may be carried out either in bulk, by emulsion or dispersion techniques or in solution. When conducting the reaction in solution any inert reaction medium may be employed, dioxane, for example, being highly satisfactory. It is essential that anhydrous conditions be employed. Nitrogen blanketing may be employed to advantage in order to better assure anhydrous conditions. Suitable reaction temperatures are in the range of from 0° C. to 60° C.

In order to illustrate the invention in greater detail, the following examples of specific preparations are presented. It is to be understood that the examples are given by way of illustration only and are not intended to be limitative.

Example I

Into a 3-necked flask fitted with a thermometer and a water-cooled condenser, protected from atmospheric moisture by an anhydrous calcium sulfate filled drying tube, there was introduced 15.0 grams of acrylyl chloride and 50 ml. of carbon tetrachloride which had been previously dried over calcium hydride. Then to this solution there was added 0.04 gram of benzoyl peroxide dissolved in 100 ml. of dry carbon tetrachloride. The mixture was then brought to and kept under a mild reflux for approximately 72 hours. Following this period of reaction, approximately 3 grams, a 20 percent yield of a solid, pale yellow polyacrylyl chloride had settled out in the flask. This product was then separated from the mother liquor by decantation.

A portion (0.25 gram) of the above prepared solid polyacrylyl chloride was dissolved in 4 ml. of dioxane which had been previously dried over calcium hydride. To this solution there was then added 6 grams of highly purified alpha-pyrrolidone and 0.2 gram of sodium hydride. Within 3 minutes the reaction mixture became a gel that would not deform upon vigorous shaking of the flask, and within an hour the reaction mixture became a semi-solid. It was allowed to stand at approximately 25° C. overnight. The polymer cake was then broken up in the presence of water with a Waring Blendor and the mixture filtered. The recovered polymer was then washed with water and air-dried to constant weight. A yield of 3.0 grams, approximately 50 percent of the theoretical was obtained.

A solution of the above prepared graft copolymer was effected by introducing 0.5 grams of the polymer into 3.0 grams of 98 percent formic acid while heating the mixture to 80° C. The specific viscosity of the polymer determined on 0.5 percent solutions in 90 percent formic acid at about 25° C. was 4.53, indicating a very high molecular weight. Clear, non-powdery films were prepared which were characterized by an unusually soft hand.

Example II

The following preparation was conducted in order to demonstrate the differences realized when an acrylyl chloride monomer is substituted for the polyacrylyl chloride in a solution polymerization conducted in a manner identical to that described in Example I above.

To a homogeneous solution of 4 ml. of dried dioxane and 6 grams of highly purified alpha-pyrrolidone, there was added 0.2 gram of sodium hydride. After the evolution of hydrogen had ceased, 0.2 ml. of monomeric acrylyl chloride was added with shaking. After 40 minutes the solution was cloudy, but a completely free flowing liquid. From Example I above, it is noted that when polyacrylyl chloride was used rather than monomeric acrylyl chloride, the mixture became a non-flowing gel in 3 minutes. After the acrylyl chloride activated reaction mixture stood at about 25° C. overnight, it was a soft cake. Upon washing with water in the usual way, only a trace of polymer was recovered on filtration. This is contrasted with the 50 percent yield of high molecular weight polymer recovered from the polyacrylyl chloride activated reaction mixture in Example I above after an equivalent reaction time.

The novel graft copolymers produced in accordance with this invention have valuable properties, for example, they are suitable for use in the production of films and fibers, as has been demonstrated in the foregoing examples. They may also be adapted for other end-uses to which polymers are often applied, such as coatings, lacquers and plastics.

Various modifications of the invention as described hereinabove will be apparent to those skilled in polymer chemistry. Hence, it will be understood that the invention is not limited to the foregoing description but only by the appended claims.

We claim:
1. A graft copolymer of the formula:

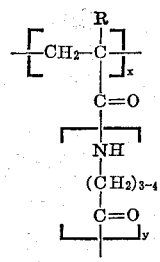

wherein R is selected from the group consisting of hydrogen, an alkyl radical and an aryl radical; wherein $x$ represents an integer of 5 to 10,000 and $y$ represents an integer of 5 to 5,000.

2. A graft copolymer of the formula:

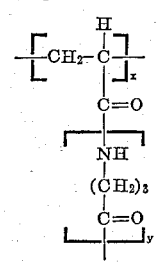

wherein $x$ represents an integer of from 5 to 10,000, and $y$ represents an integer of 5 to 5,000.

3. A process for preparing a graft copolymer which comprises reacting at a temperature in the range of from 0° C. to 60° C. and under anhydrous conditions a mixture of from 0.1 to 15 percent by weight of a pre-formed polymer of the formula:

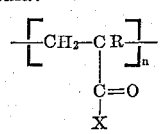

wherein R is selected from the group consisting of hydrogen, an alkyl radical and an aryl radical; wherein $n$ is an integer of from 5 to 10,000 and X is a halide; and from 85 to 99.9 percent by weight of the combination of (A) a 5 to 6 membered ring lactam and (B) an alkali metal salt of said 5 to 6 membered ring lactam, said alkali metal salt being present in an amount which exceeds that necessary to completely neutralize all of the acyl halide groups of said pre-formed polymer.

4. A process for preparing a graft copolymer which comprises reacting at a temperature in the range of from 0° C. to 60° C. and under anhydrous conditions a mixture of from 0.1 to 15 percent by weight of a pre-formed polymer of the formula:

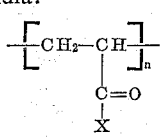

wherein $n$ is an integer of from 5 to 10,000 and X is a halide; and from 85 to 99.9 percent by weight of the combination of (A) alpha-pyrrolidone and (B) an alkali metal salt of said alpha-pyrrolidone, said alkali metal salt being present in an amount which exceeds that necessary to completely neutralize all of the acyl halide groups of said pre-formed polymer.

References Cited by the Examiner

UNITED STATES PATENTS 3,136,738    6/1964    Hedrick et al. _____ 260—857

MURRAY TILLMAN, *Primary Examiner.*

P. LIEBERMAN, *Assistant Examiner.*